US012286585B2

(12) United States Patent
Alarawi et al.

(10) Patent No.: US 12,286,585 B2
(45) Date of Patent: Apr. 29, 2025

(54) FOAMED GEL SYSTEM FOR WATER SHUT OFF IN SUBTERRANEAN ZONES (71) Applicant: Saudi Arabian Oil Company, Dhahran (SA)

(72) Inventors: Abeer Ateeq Alarawi, Al Khobar (SA); Ayman Mohammed Almohsin, Doha (SA); Ahmad Busaleh, Saihat (SA)

(73) Assignee: Saudi Arabian Oil Company, Dhahran (SA)

( * ) Notice: Subject to any disclaimer, the term of this patent is extended or adjusted under 35 U.S.C. 154(b) by 168 days.

(21) Appl. No.: 17/871,688

(22) Filed: Jul. 22, 2022

(65) Prior Publication Data
US 2024/0026207 A1    Jan. 25, 2024

(51) Int. Cl.
*C09K 8/467*    (2006.01)
*E21B 33/138*   (2006.01)

(52) U.S. Cl.
CPC ............ *C09K 8/467* (2013.01); *E21B 33/138* (2013.01)

(58) Field of Classification Search
None
See application file for complete search history.

(56) References Cited

U.S. PATENT DOCUMENTS

| 4,732,213 A * | 3/1988 | Bennett | C09K 8/50 166/275 |
| 7,875,575 B2 | 1/2011 | Huang et al. | |
| 2002/0023752 A1 | 2/2002 | Qu et al. | |
| 2007/0042913 A1 * | 2/2007 | Hutchins | C09K 8/685 507/214 |
| 2009/0139766 A1 * | 6/2009 | Samuel | E21B 43/1195 507/239 |
| 2012/0181033 A1 * | 7/2012 | Saini | C09K 8/265 166/308.1 |
| 2013/0118748 A1 * | 5/2013 | Miquilena | C09K 8/80 166/305.1 |
| 2015/0007989 A1 | 1/2015 | Tan et al. | |
| 2021/0363408 A1 * | 11/2021 | Goual | E21B 43/34 |

FOREIGN PATENT DOCUMENTS

| EP | 0835983 | 4/1998 |
| WO | WO 2004048752 | 6/2004 |

OTHER PUBLICATIONS

PCT International Search Report and Written Opinion in International Appln. No. PCT/US2023/028355, dated Nov. 20, 2023, 13 pages.

(Continued)

*Primary Examiner* — Anuradha Ahuja
(74) *Attorney, Agent, or Firm* — Fish & Richardson P.C.

(57) ABSTRACT

A foam composition includes a foam stabilizer, a foaming agent, a brine, and an inert gas. The foam stabilizer includes graphene. The foaming agent includes a viscoelastic surfactant. The inert gas is in the form of gas bubbles dispersed through a mixture of the foam stabilizer, the foaming agent, and the brine. The foam composition is configured to convert to a gel that is substantially impermeable to fluid flow in response to exposure to downhole conditions of a subterranean zone.

17 Claims, 5 Drawing Sheets

(56) References Cited

OTHER PUBLICATIONS

Fathima et al., "Polymer nanocomposites for water shutoff application—A review," Materials Research Express, Dec. 2018, 6(3):032001.

Fu et al., "Applications of Graphene and Its Derivatives in the Upstream Oil and Gas Industry: A Systematic Review," Nanomaterials, May 2020, 10(6):1013.

Paprouschi et al., "Effect of silicate sodium and graphene nanoplatelets on morphology and rheology characteristics of new synthesized preformed particle gel (PPG) for water shut-off treatment," Journal of Petroleum Science and Engineering, Sep. 2021, 204:108736.

Seright et al., "Water shutoff and conformance improvement: An introduction," Petroleum Science, Feb. 2021, 18:450-478.

Thakkar et al., "A comprehensive review of the application of nano-silica in oil well cementing," Petroleum, Jun. 2020, 6(2):123-129.

Wang et al., "Study of Displacement Efficiency and Flow Behavior of Foamed Gel in Non-Homogeneous Porous Media," PLoS One, Jun. 2015, 10(6):e0128414.

\* cited by examiner

FOAMED GEL SYSTEM FOR WATER SHUT OFF IN SUBTERRANEAN ZONES

TECHNICAL FIELD

This disclosure relates to water control in wellbore applications. In particular, in some embodiments, this disclosure is directed to a foamed gel system that can block (or shut-off) water ingress into a subterranean zone.

BACKGROUND

A common problem experienced during the extraction of mineral hydrocarbons (for example, crude oil and natural gas) from subterranean reservoirs is co-extraction of water. Water occurs naturally in oil and gas wells and reservoirs, for example, from an underlying aquifer or from injector wells, and can mix with and be extracted with the produced hydrocarbons. Co-extraction of water along with mineral hydrocarbons requires expensive separation, treatment, and disposal, which in many cases involves re-injection back into the well. Water cut is the ratio of the quantity of water produced to the total quantity of fluids produced from the production well. It is desirable to minimize the quantity of water that is brought up to the surface, that is, minimize the water cut. There are many ways that water can enter a subterranean zone, such as, for example, a wellbore or reservoir, during hydrocarbon extraction, for example through porous rock formations such as sedimentary layers or via networks of fissures or cracks that link with a source of water or gas.

SUMMARY

This disclosure describes technologies relating to water shut-off in subterranean zones. Certain aspects of the subject matter described can be implemented as a foam composition. The foam composition includes a foam stabilizer, a foaming agent, a brine, and an inert gas. The foam stabilizer includes graphene. The foaming agent includes a viscoelastic surfactant. The inert gas is in the form of gas bubbles dispersed through a mixture of the foam stabilizer, the foaming agent, and the brine. The foam composition is configured to convert to a gel that is substantially impermeable to fluid flow in response to exposure to downhole conditions of a subterranean zone.

This, and other aspects, can include one or more of the following features. In some implementations, the foam stabilizer is in a range of from about 0.7 weight per volume percent (w/v %) to about 1.5 w/v % of the foam composition. In some implementations, the foaming agent is in a range of from about 5 volume percent (vol. %) to about 15 vol. % of the foam composition. In some implementations, the brine is in a range of from about 85 vol. % to about 95 vol. % of the foam composition. In some implementations, the inert gas is nitrogen gas, and a foam quality of the foam composition is in a range of from about 60% to about 70%. In some implementations, a ratio of the inert gas to the mixture of the foam stabilizer, the foaming agent, and the brine is in a range of from about 3:7 to about 4:6. In some implementations, the brine comprises potassium chloride and has a salt concentration in a range of from about 0.5 weight percent (wt. %) to about 40 wt. %. In some implementations, the foaming agent is about 10.5 volume percent (vol. %) of the foam composition. In some implementations, the foam stabilizer includes graphene nanoplatelets that include 92 wt. % carbon and 7 wt. % oxygen.

Certain aspects of the subject matter described can be implemented as a method. A mixture of a foam stabilizer, a foaming agent, and a brine is placed into a wellbore formed in a subterranean formation. The foam stabilizer includes graphene. The foaming agent includes a viscoelastic surfactant. An inert gas is placed into the wellbore. The inert gas and the mixture are placed together into the wellbore, such that the inert gas disperses as gas bubbles throughout the mixture to form a foam within the wellbore. The foam is flowed to a specified downhole location in the subterranean formation, thereby exposing the foam to a downhole temperature, which causes the foam to convert to a gel that is impermeable to fluid flow.

This, and other aspects, can include one or more of the following features. In some implementations, the mixture and the inert gas are mixed prior to placing into the wellbore to form the foam, and the foam is placed into the wellbore. In some implementations, additional inert gas is flowed together with the foam into the wellbore. In some implementations, the foam stabilizer is in a range of from about 0.7 weight per volume percent (w/v %) to about 1.5 w/v % of the foam composition. In some implementations, the foaming agent is in a range of from about 5 volume percent (vol. %) to about 15 vol. % of the foam composition. In some implementations, the brine is in a range of from about 85 vol. % to about 95 vol. % of the foam composition. In some implementations, the inert gas is nitrogen gas, and a foam quality of the foam composition is in a range of from about 60% to about 70%. In some implementations, a ratio of the inert gas to the mixture of the foam stabilizer, the foaming agent, and the brine is in a range of from about 3:7 to about 4:6. In some implementations, the brine comprises potassium chloride and has a salt concentration in a range of from about 0.5 weight percent (wt. %) to about 40 wt. %. In some implementations, the foaming agent is about 10.5 volume percent (vol. %) of the foam composition. In some implementations, the foam stabilizer includes graphene nanoplatelets that include 92 wt. % carbon and 7 wt. % oxygen.

Certain aspects of the subject matter described can be implemented as a method. A foam stabilizer, a foaming agent, a brine, and nitrogen gas are mixed to form a foam. The foam stabilizer includes graphene. The foaming agent includes a viscoelastic surfactant. The foam and additional nitrogen gas are flowed together to a specified downhole location in a subterranean formation, thereby exposing the foam to a downhole temperature, which causes the foam to convert to a gel that is substantially impermeable to aqueous fluid flow. After the foam has converted to the gel, a hydrocarbon is produced from the subterranean formation. The gel prevents leakage of aqueous fluid from the specified downhole location, such that the aqueous fluid is prevented from being produced with the hydrocarbon from the subterranean formation.

This, and other aspects, can include one or more of the following features. In some implementations, the foam stabilizer is in a range of from about 0.7 weight per volume percent (w/v %) to about 1.5 w/v % of the foam. In some implementations, the foaming agent is in a range of from about 5 volume percent (vol. %) to about 15 vol. % of the foam. In some implementations, the brine is in a range of from about 85 vol. % to about 95 vol. % of the foam. In some implementations, a foam quality of the foam is in a range of from about 60% to about 70%. In some implementations, a ratio of the nitrogen gas to a sum of the foam stabilizer, the foaming agent, and the brine of the foam is in a range of from about 3:7 to about 4:6. In some implementations, the brine comprises potassium chloride and has a salt concentration in a range of from about 0.5 weight percent (wt. %) to about 40 wt. %. In some implementations, the foaming agent is about 10.5 volume percent (vol. %) of the foam. In some implementations, the foam stabilizer includes graphene nanoplatelets that include 92 wt. % carbon and 7 wt. % oxygen.

The details of one or more implementations of the subject matter of this disclosure are set forth in the accompanying drawings and the description. Other features, aspects, and advantages of the subject matter will become apparent from the description, the drawings, and the claims.

DETAILED DESCRIPTION

This disclosure describes a foamed gel system. The foamed gel system includes a stabilizer (such as graphene), a foaming agent (such as a viscoelastic surfactant), an inert gas (such as nitrogen gas), and brine. The foamed gel system can be used to inhibit and/or shut off the flow of water in hydrocarbon-producing wells. The foamed gel system can be pumped into a subterranean formation as a foamed fluid, which can then convert into a high viscosity gel in response to exposure to downhole temperatures (for example, in a range of from about 77 degrees Fahrenheit (° F.) to about 200° F.).

The subject matter described in this disclosure can be implemented in particular implementations, so as to realize one or more of the following advantages. The foamed gel system described can penetrate deeply into rock matrices and tight reservoirs to perform water shut-off operations. The foamed gel system described has high mechanical strength and low volume, which can be useful in fine-tuned placement of the foamed gel system to shut-off water production in subterranean formations. The foamed gel system described can be less damaging (for example, to the subterranean formation) and less costly in comparison to conventional gel systems that are used in water shut-off applications. The viscosity and gelation time of the foamed gel system described can be adjusted and finely controlled to desired levels by adjusting concentrations of the stabilizer and the foaming agent present in the foamed gel system. The foamed gel system described can remain stable in harsh, downhole environments, which can include high temperatures, high salinity, and high pH. Once the foamed gel system has converted into a gel, the gel does not flow and does not distribute along the subterranean formation due to its high viscosity. The foamed gel system described is versatile and can convert into a gel across a wide range of temperatures, (for example, in a range of from about 77° F. to about 200° F.).

Figure 1A:
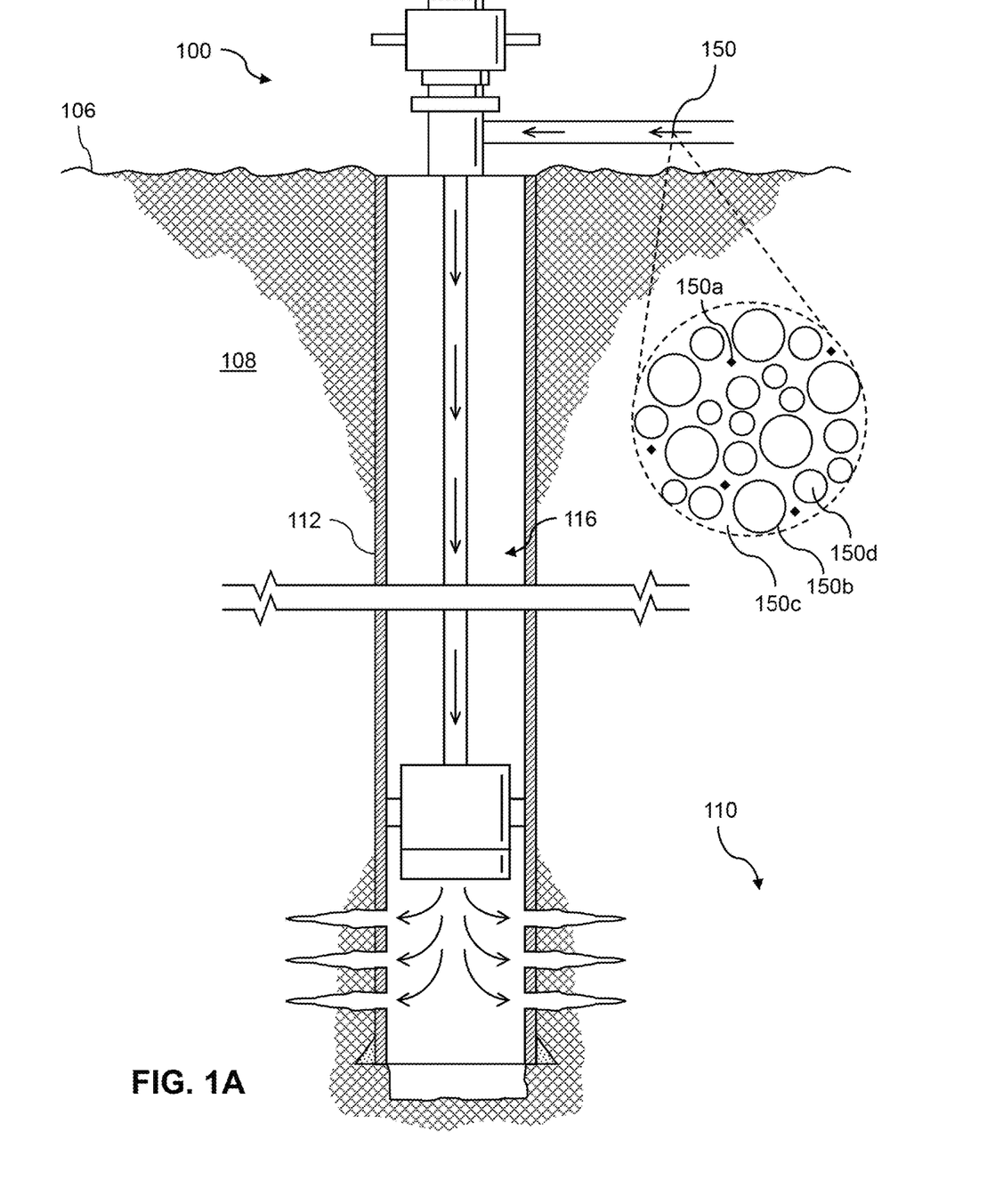
FIG. 1A is a schematic diagram of an example well.

FIG. 1A depicts an example well 100 constructed in accordance with the concepts herein. The well 100 extends from the surface 106 through the Earth 108 to one more subterranean zones of interest 110 (one shown). The well 100 enables access to the subterranean zones of interest 110 to allow recovery (that is, production) of fluids to the surface 106 (represented by flow arrows in FIG. 1A) and, in some implementations, additionally or alternatively allows fluids to be placed in the Earth 108. In some implementations, the subterranean zone 110 is a formation within the Earth 108 defining a reservoir, but in other instances, the zone 110 can be multiple formations or a portion of a formation. The subterranean zone can include, for example, a formation, a portion of a formation, or multiple formations in a hydrocarbon-bearing reservoir from which recovery operations can be practiced to recover trapped hydrocarbons. In some implementations, the subterranean zone includes an underground formation of naturally fractured or porous rock containing hydrocarbons (for example, oil, gas, or both). In some implementations, the well can intersect other types of formations, including reservoirs that are not naturally fractured. For simplicity's sake, the well 100 is shown as a vertical well, but in other instances, the well 100 can be a deviated well with a wellbore deviated from vertical (for example, horizontal or slanted), the well 100 can include multiple bores forming a multilateral well (that is, a well having multiple lateral wells branching off another well or wells), or both.

In some implementations, the well 100 is a gas well that is used in producing hydrocarbon gas (such as natural gas) from the subterranean zones of interest 110 to the surface 106. While termed a "gas well," the well need not produce only dry gas, and may incidentally or in much smaller quantities, produce liquid including oil, water, or both. In some implementations, the well 100 is an oil well that is used in producing hydrocarbon liquid (such as crude oil) from the subterranean zones of interest 110 to the surface 106. While termed an "oil well," the well not need produce only hydrocarbon liquid, and may incidentally or in much smaller quantities, produce gas, water, or both. In some implementations, the production from the well 100 can be multiphase in any ratio. In some implementations, the production from the well 100 can produce mostly or entirely liquid at certain times and mostly or entirely gas at other times. For example, in certain types of wells it is common to produce water for a period of time to gain access to the gas in the subterranean zone. The concepts herein, though, are not limited in applicability to gas wells, oil wells, or even production wells, and could be used in wells for producing other gas or liquid resources or could be used in injection wells, disposal wells, or other types of wells used in placing fluids into the Earth.

The wellbore of the well 100 is typically, although not necessarily, cylindrical. All or a portion of the wellbore is lined with a tubing, such as casing 112. The casing 112 connects with a wellhead at the surface 106 and extends downhole into the wellbore. The casing 112 operates to isolate the bore of the well 100, defined in the cased portion of the well 100 by the inner bore 116 of the casing 112, from the surrounding Earth 108. The casing 112 can be formed of a single continuous tubing or multiple lengths of tubing joined (for example, threadedly) end-to-end. In FIG. 1A, the casing 112 is perforated in the subterranean zone of interest 110 to allow fluid communication between the subterranean zone of interest 110 and the bore 116 of the casing 112. In some implementations, the casing 112 is omitted or ceases in the region of the subterranean zone of interest 110. This portion of the well 100 without casing is often referred to as "open hole."

The wellhead defines an attachment point for other equipment to be attached to the well 100. For example, FIG. 1A shows well 100 being produced with a Christmas tree attached to the wellhead. The Christmas tree includes valves used to regulate flow into or out of the well 100. In particular, casing 112 is commercially produced in a number of common sizes specified by the American Petroleum Institute (the "API"), including 4-½, 5, 5-½, 6, 6-⅝, 7, 7-⅝, 7-¾, 8-⅝, 8-¾, 9-⅝, 9-¾, 9-⅞, 10-¾, 11-¾, 11-⅞, 13-⅜, 13-½, 13-⅝, 16, 18-⅝, and inches, and the API specifies internal diameters for each casing size.

Figure 1B:
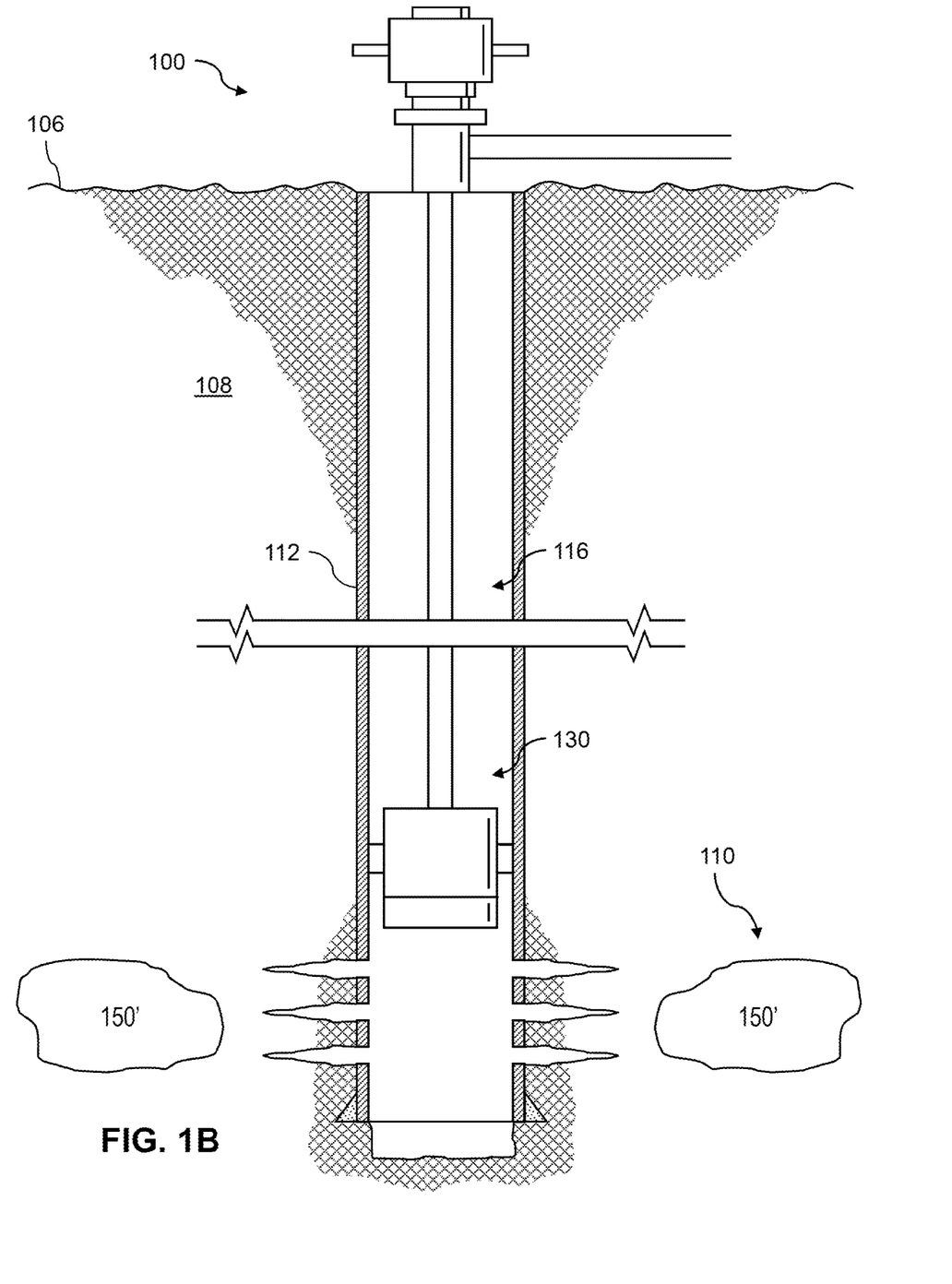
FIG. 1B is a schematic diagram of the well of FIG. 1A including a gel that has formed a blockage preventing flow of water into the wellbore.

A foam 150 can be placed in the well 100. The foam 150 is configured to convert to a gel (an example is shown in FIG. 1B and described in more detail later) that can form a blockage to prevent fluid from flowing from the subterranean zone and into the wellbore of the well 100 (for example, for water shut-off). The foam 150 is configured to convert to the gel in response to exposure to downhole conditions of a subterranean zone. For example, the foam 150 can be configured to the gel (which is substantially impermeable to fluid flow) in response to exposure to downhole temperatures in a range of from about 77° F. to about 200° F., from about ° F. to about 200° F., from about 90° F. to about 200° F., from about 100° F. to about 200° F., from about 110° F. to about 200° F., from about 120° F. to about 200° F., from about 130° F. to about 200° F., from about 140° F. to about 200° F., from about 150° F. to about 200° F., from about 160° F. to about 200° F., from about 170° F. to about 200° F., from about 180° F. to about 200° F., or from about 190° F. to about 200° F.

The foam 150 includes a foam stabilizer 150a, a foaming agent 150b, a brine 150c, and an inert gas 150d. The foam stabilizer 150a includes graphene. The foaming agent 150b includes a viscoelastic surfactant (VES). A viscoelastic surfactant is a surfactant that has viscoelastic properties in aqueous solution. Similar to conventional surfactants, viscoelastic surfactants include hydrophilic head groups and hydrophobic chains. Viscoelastic surfactants, however, exhibit viscoelastic characteristics due to their ability to form wormlike micelles and entangled structures through hydrophobic interactions, electrostatic interactions, and hydrogen bonding interactions in aqueous solutions. Viscoelasticity refers to the property of materials that exhibit both viscous and elastic characteristics when undergoing deformation. Viscous materials resist shear flow and strain linearly with time when a stress is applied. Elastic materials strain when stretched and quickly return to their original state once the stress is removed. Viscoelastic materials exhibit both of these properties and, as such, exhibit time-dependent strain. The brine 150c is an aqueous salt solution. The inert gas 150d is in the form of gas bubbles dispersed through a mixture of the foam stabilizer 150a, the foaming agent 150b, and the brine 150c, thereby forming the foam 150. The inert gas 150d can be, for example, nitrogen gas. In some implementations, the inert gas 150d is substituted with air. In some implementations, a foam quality (that is, a ratio of gas volume to foam volume (volume of gas and liquid), sometimes referred to as gas fraction) of the foam 150 is in a range of from about 60% to about 70%. In some implementations, a ratio of the inert gas 150d to the remaining portion of the foam 150 (the foam stabilizer 150a, the foaming agent 150b, and the brine 150c) is in a range of from about 3:7 to about 4:6.

Graphene is a single layer of graphite or carbon atoms that are arranged in a honeycomb lattice. The graphene of the foam stabilizer 150a can be in any form. For example, the graphene of the foam stabilizer 150a can be in the form of graphene powder, graphene solution, or graphene paste. In some implementations, the foam stabilizer 150a includes a composite material (that is, a material having multiple constituents) that includes graphene. For example, the foam stabilizer 150a includes graphene oxide (GO, which includes carbon, oxygen, and hydrogen) and/or reduced graphene oxide (rGO, which includes less oxygen and more carbon in comparison to GO). The foam stabilizer 150a can include, for example, very few layer graphene (vFLG, which includes from 1 to 3 layers of carbon), few layer graphene (FLG, which includes from 2 to 5 layers of carbon), and/or multi-layer graphene (MLG, which includes from 2 to 10 layers of carbon). In some implementations, the foam stabilizer 150a includes functionalized graphene. For example, a functional group can be added to the graphene to add elements to the surface and/or edges of the graphene for certain applications. In some implementations, the graphene is functionalized with N-(trimethoxysilylpropyl)ethylenediamine triacetic acid (EDTA-silane), and/or poly(methyl methacrylate) (PMMA). In some implementations, the hydroxyl groups (—OH) of the graphene oxide (GO) are functionalized by esterification. For example, the esterification functionalization of the hydroxyl groups of the GO includes reacting the GO with nitriles and separating the reaction products via filtration and/or centrifugation. In some implementations, the GO is functionalized with poly-L-lactic acid (PLLA). In some implementations, the GO functionalized with PLLA is functionalized via esterification to synthesize a GO framework. For example, GO can be combined with 1,3-benzenediboronic acid to form boronic esters. In such cases, single layer GO sheets can be cross-linked together, forming a three-dimensional porous network that is connected by benzenediboronic acid pillars. The GO framework structures can have modifiable pore widths, volumes, and binding sites, which make them advantageous for gas storage and providing stability to a foam. Similar to hydroxyl and epoxy groups, carbonyl groups can be functionalized through activation and amidation or esterification with small molecules or polymer chemical linkers. In some cases, graphene can be functionalized with biomolecules, such as deoxyribonucleic acid (DNA), proteins, and enzymes.

Decreasing the concentration of the foam stabilizer 150a in the foam 150 can increase gelation time of the foam 150, can decrease the viscosity of the gel formed by the foam 150, and can decrease the stability of the gel formed by the foam 150. Increasing the concentration of the foam stabilizer 150a in the foam 150 can decrease the delivery rate of the fluid film between liquid and gas phases, can decrease gelation time of the foam 150, can increase the viscosity of the gel formed by the foam 150, and can increase the stability of the gel formed by the foam 150. In some implementations, the foam stabilizer 150a is in a range of from about 0.7 weight per volume percent (w/v %) to about 1.5 w/v % of the foam 150.

The foaming agent 150b has low interfacial tension, high foaming ability, compatibility with formation water (that is, easily soluble in formation water independent of precipitating solids), and stability (that is, chemically inert and resists thermal degradation) under downhole conditions. In some implementations, the foaming agent 150b has an interfacial tension in a range of from about 20 millinewtons per meter (mN/m) to about 35 mN/m. Foaming ability refers to the amount or volume of foam generated under specified conditions (such as the method used to generate the foam, temperature of solution, hardness of the water used, and/or electrolyte content of the water used). In some implementations, the foaming agent 150b includes a cationic surfactant, which carries a positive charge. Some examples of cationic surfactants include amine-based surfactants (such as trimethylamine hydrochloride and octenide dihydrochloride) and quaternary ammonium salts (such as cetylpyridinium chloride and benzethonium chloride). In some implementations, the foaming agent 150b includes an anionic surfactant, which carries a negative charge. The anionic surfactant can include a polar group that includes a heteroatom (such as oxygen, sulfur, phosphorus, silicon, or nitrogen), which can be present, for example, in functional groups such as an alcohol, thiol, ether, ester, acid, sulfate, sulfonate, phosphate, amine, or amide. The anionic surfactant can include a nonpolar group, such as a hydrocarbon chain. Some examples of anionic surfactants include sodium dodecyl sulfate (SD S), alkyl ethylene oxide sulfates (for example, a sulfate with three ethylene oxide groups), alkylbenzene sulfonate (such as sodium dodecylbenzene), substituted sulfosuccinates (such as diethylhexyl sodium sulfosuccinate or dioctyl sodium sulfosuccinate), alkyl phosphates, salts of fatty acids, and alpha-olefin sulfonates (AOS). In some implementations, the foaming agent 150b includes a nonionic surfactant. Some examples of nonionic surfactants include fatty alcohol ethoxylate, alkyl phenol ethoxylate, and fatty acid alkoxylate. In some implementations, the foaming agent 150b includes an amphoteric surfactant, which includes molecular structures designated as alkyl amphoacetates, alkyl amphopropionates, or alkyl iminopropionates. Some examples of amphoteric surfactants include alkylamidopropylamine N-oxide (APAO), alkyldimethylamine N-oxide (AO), alkylbetaine (Bt), alkylamidopropylbetaine (APB), cocamidopropyl betaine, cocoamphoacetate, and cocoamphodiacetate. Decreasing the concentration of the foaming agent 150b in the foam 150 can increase gelation time of the foam 150, can decrease the viscosity of the gel formed by the foam 150, and can decrease the stability of the gel formed by the foam 150. Increasing the concentration of the foaming agent 150b in the foam 150 can decrease gelation time of the foam 150, can increase the viscosity of the gel formed by the foam 150, and can increase the stability of the gel formed by the foam 150. In some implementations, the foaming agent 150b is in a range of from about 5 volume percent (vol. %) to about 15 vol. % of the foam 150.

The brine 150c can be prepared by mixing salt with water. For example, the brine 150c can be an aqueous solution that includes sodium chloride (NaCl), potassium chloride (KCl), calcium chloride ($CaCl_2$), magnesium chloride ($MgCl_2$), ammonium chloride ($NH_4Cl$), calcium bromide ($CaBr_2$), sodium bromide (NaBr), sodium formate (HCOONa), potassium formate (HCOOK), or any combination of these. In some implementations, the brine 150c is seawater or processed seawater (that is, seawater that has been processed to alter properties of the seawater, for example, diluted). The presence of salt(s) in the brine 150c can reduce the volume of the gel formed by the foam 150 and may reduce the stability of the gel formed by the foam 150. However, the presence of salt(s) in the brine 150c can also reduce a collapse rate the gel formed by the foam 150. Thus, the salt concentration of the brine 150c can be altered based on desired characteristics of the gel formed by the foam 150. The brine 150c can have a salt concentration in a range of from about 0.5 weight percent (wt. %) to about 50 wt. %, from about 0.5 wt. % to about 40 wt. %, from about 0.5 wt. % to about 30 wt. %, from about 0.5 wt. % to about 20 wt. %, from about 0.5 wt. % to about 10 wt. %, from about 0.5 wt. % to about 5 wt. %, from about 5 wt. % to about 50 wt. %, from about 5 wt. % to about 40 wt. %, from about 5 wt. % to about 30 wt. %, from about 5 wt. % to about 20 wt. %, from about 5 wt. % to about 10 wt. %, from about 10 wt. % to about 50 wt. %, from about 10 wt. % to about 40 wt. %, from about 10 wt. % to about 30 wt. %, from about wt. % to about 20 wt. %, from about 20 wt. % to about 50 wt. %, from about 20 wt. % to about wt. %, from about 20 wt. % to about 30 wt. %, from about 30 wt. % to about 50 wt. %, from about 30 wt. % to about 40 wt. %, or from about 40 wt. % to about 50 wt. %. In some implementations, the brine 150c is an aqueous solution of NaCl and $CaCl_2$. In some implementations, the brine 150c is an aqueous solution of NaCl, $CaCl_2$, and $CaBr_2$. In some implementations, the brine 150c is in a range of from about 85 vol. % to about 95 vol. % of the foam 150.

FIG. 1B is a schematic diagram of the well 100 in which the foam 150 has formed a gel 150', providing a blockage that mitigates and/or prevents the flow of water into the wellbore. The gel 150' is positioned at a downhole location in the well 100 from which blockage of aqueous fluids from the subterranean formation is desired, such that the aqueous fluids do not leak into the wellbore of the well 100. Once formed, the gel 150' is substantially impermeable to fluid flow. The gel 150' prevents the aqueous fluids from being produced along with desirable hydrocarbon(s) to the surface 106. In some implementations, the gel 150' has a permeability that is less than about millidarcy (mD). For example, the gel 150' can have a permeability in a range of from about 500 mD to about 5,000 mD. In some implementations, the gel 150' has a compressive strength greater than about 7,000 Pascals (Pa). For example, the gel 150' can have a permeability in a range of from about 7,000 Pa to about 10,000 Pa. In some implementations, the gel 150' has a viscosity greater than about 1,000 centipoise (cP). For example, the gel 150' can have a viscosity in a range of from about 1,000 cP to about 4,000 cP.

Figure 2:
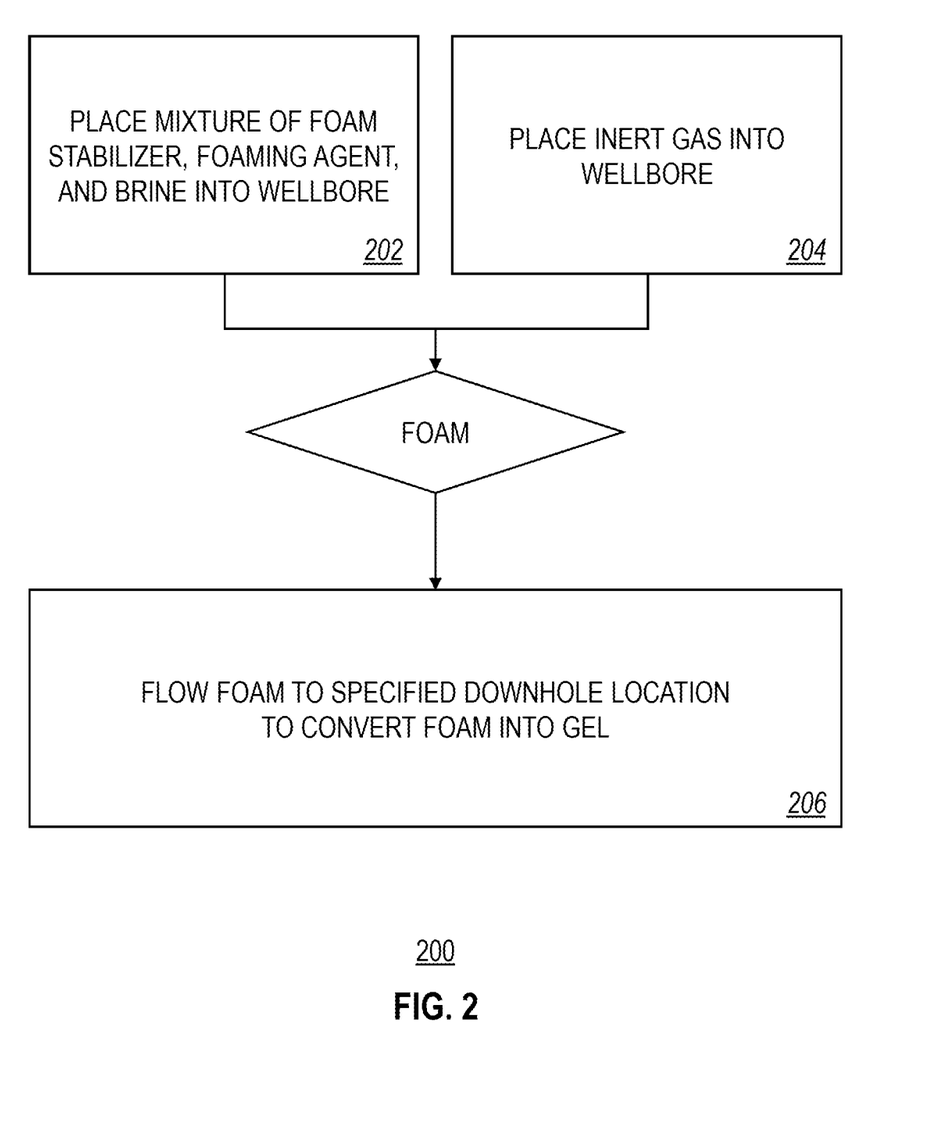
FIG. 2 is a flow chart of an example method of shutting off a flow of water into a wellbore.

FIG. 2 is a flow chart of an example method 200 of shutting off a flow of water into a wellbore. At block 202, a mixture of a foam stabilizer (such as the foam stabilizer 150a), a foaming agent (such as the foaming agent 150b), and a brine (such as the brine 150c) is placed into a wellbore formed in a subterranean formation (such as the wellbore of the well 100). As described previously, the foam stabilizer 150a includes graphene, and the foaming agent 150b includes a viscoelastic surfactant. At block 204, an inert gas (such as the inert gas 150d) is placed into the wellbore. The inert gas 150d placed into the wellbore at block 204 can be, for example, nitrogen gas. The mixture (placed into the wellbore at block 202) and the inert gas 150d (placed into the wellbore at block 204) can be placed together into the wellbore, such that the inert gas 150d disperses as gas bubbles throughout the mixture to form a foam (such as the foam 150) within the wellbore. In some implementations, the mixture and the inert gas 150d are mixed prior to placing into the wellbore at blocks 202 and 204, respectively. Mixing the mixture and the inert gas 150d can form the foam 150, and the foam 150 can be placed into the wellbore. At block 206, the foam 150 is flowed to a specified downhole location in the subterranean formation. In some implementations, additional inert gas is flowed together with the foam 150 into the wellbore. The specified downhole location in the subterranean formation is a location within the subterranean formation from which water shut-off is desired. Flowing the foam 150 to the specified downhole location at block 206 exposes the foam 150 to a downhole temperature, which causes the foam 150 to convert to a gel (such as the gel 150') that is impermeable to fluid flow (for example, aqueous fluid flow). Once the gel 150' has formed, the flow of water from the specified downhole location into the wellbore is prevented. Thus, the gel 150' effectively shuts off water production from the specified downhole location. In some implementations, a cooling fluid (for example, water) is flowed into the wellbore prior to beginning the method 200 at block 202. Flowing the cooling fluid into the wellbore can decrease a downhole temperature in the well 100, which can slow the gelation time of the foam 150 to convert into the gel 150'. Cooling the well 100 can be beneficial in cases where the foam 150 requires additional time to penetrate into the subterranean formation to reach a target zone (for example, a water formation zone at which water shut-off is desired) before converting into the gel 150'.

Figure 3:
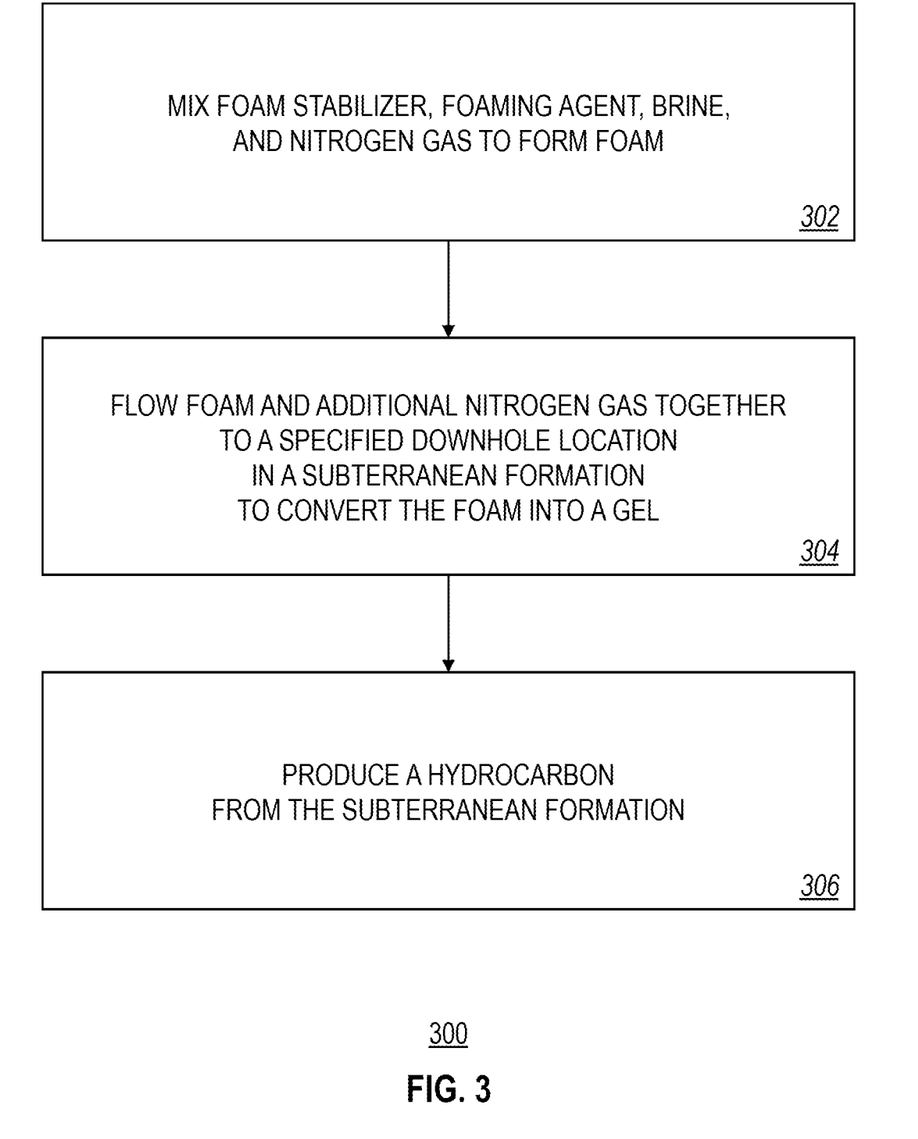
FIG. 3 is a flow chart of an example method of shutting off a flow of water into a wellbore.

FIG. 3 is a flow chart of an example method 300 of shutting off a flow of water into a wellbore. At block 302, a foam stabilizer (such as the foam stabilizer 150a), a foaming agent (such as the foaming agent 150b), a brine (such as the brine 150c), and an inert gas (such as the inert gas 150d) are mixed to form a foam (such as the foam 150). As described previously, the foam stabilizer 150a includes graphene, the foaming agent 150b includes a viscoelastic surfactant, and the inert gas 150d can be nitrogen gas. At block 304, the foam 150 and additional inert gas 150d are flowed together to a specified downhole location in a subterranean formation. The specified downhole location in the subterranean formation is a location within the subterranean formation from which water shut-off is desired. Flowing the foam 150 and the additional inert gas 150d to the specified downhole location at block 304 exposes the foam 150 to a downhole temperature, which causes the foam 150 to convert to a gel (such as the gel 150') that is impermeable to fluid flow (for example, aqueous fluid flow). Once the gel 150' has formed, the flow of water from the specified downhole location into the wellbore is prevented. Thus, the gel 150' effectively shuts off water production from the specified downhole location. After the foam 150 has converted to the gel 150', a hydrocarbon is produced from the subterranean formation at block 306. Because the gel 150' prevents leakage (flow) of aqueous fluid from the specified downhole location, the aqueous fluid is prevented from being produced with the hydrocarbon from the subterranean formation at block 306. In some implementations, a cooling fluid (for example, water) is flowed into the wellbore prior to flowing the foam 150 and the additional inert gas 150d to the specified downhole location in the subterranean formation at block 304. Flowing the cooling fluid into the wellbore can decrease a downhole temperature in the well 100, which can slow the gelation time of the foam 150 to convert into the gel 150'. Cooling the well 100 can be beneficial in cases where the foam 150 requires additional time to penetrate into the subterranean formation to reach a target zone (for example, a water formation zone at which water shut-off is desired) before converting into the gel 150'.

EXAMPLE

A foam was prepared by bubbling nitrogen gas in a mixture of 0.7 grams of graphene (mixture of hydrophilic single and multilayer graphene nanoplatelets (92 wt. % carbon, 7 wt. % oxygen)), 10.5 milliliters of viscoelastic surfactant (Armovis EHS-W by Nouryon), and grams of KCl in 100 milliliters of deionized water. The graphene was prepared via chemical vapor deposition. The graphene had a density of 0.41 grams per milliliter. The bubbles in the generated foam had dimensions in a range of from about 200 nanometers to about 300 nanometers and an average layer size in a range of from about 10 micrometers to about 20 micrometers. A control foam was also prepared with the same composition, but excluding the foam stabilizer (graphene) for comparison. At ambient conditions, the control foam converted into a gel in about 2 days, whereas the foam including the graphene converted into a gel within about 90 minutes. Further, the gel formed from the control foam remained stable without phase separation for about days at ambient conditions, while the gel formed from the foam including the graphene remained stable without phase separation for 35 days at ambient conditions.

Figure 4:
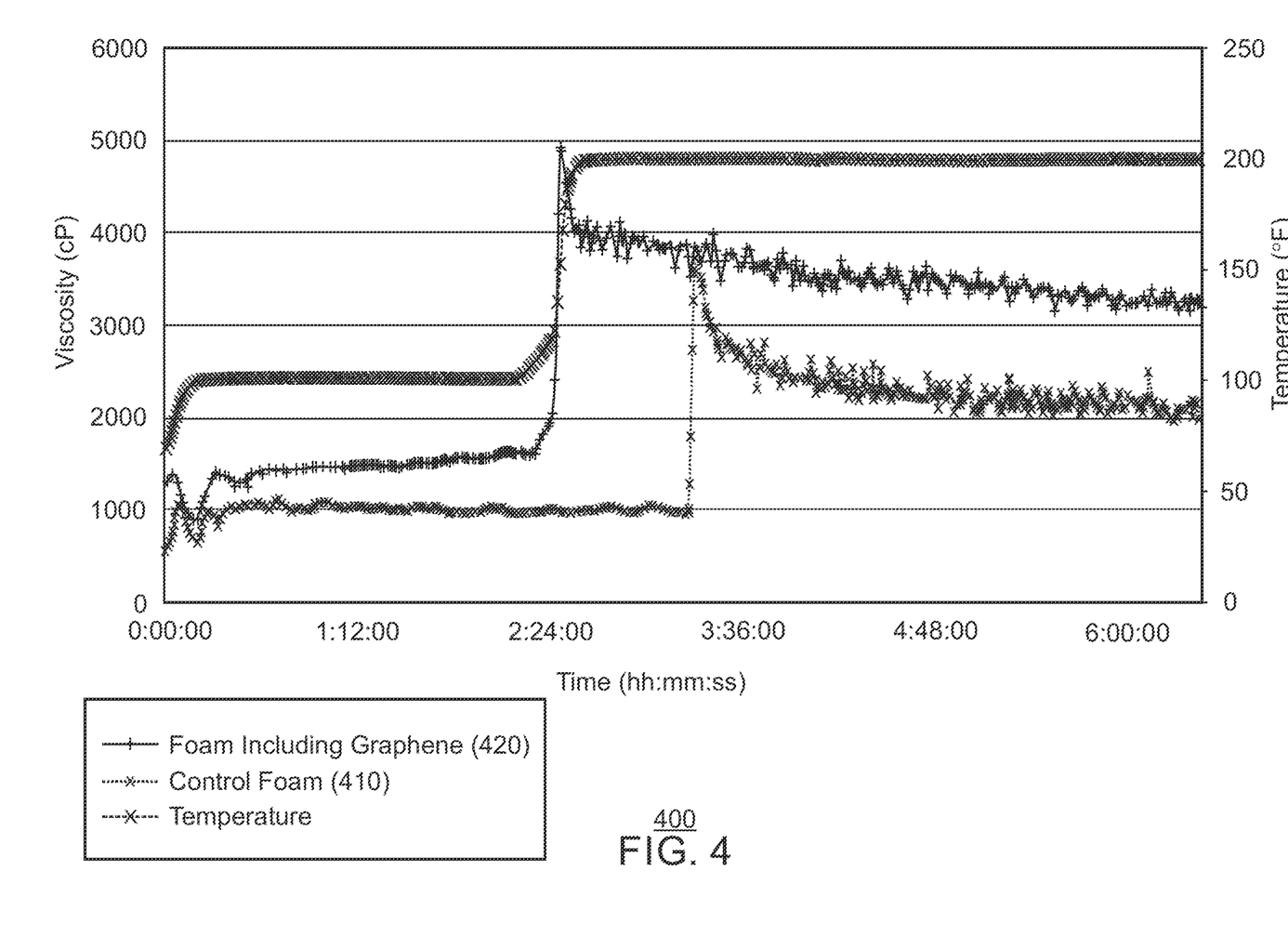
FIG. 4 is a plot of viscosity versus time for two gels formed from different forms across a range of temperatures.

The viscosities and thermal stabilities of the control foam and the foam including the graphene were also measured and compared. FIG. 4 is a plot 400 showing measured viscosity and operating temperature versus time over the duration of the experiment for the control foam 410 and the foam 420, which included the graphene. As shown in the plot 400, the foam 420 including the graphene exhibited an increased viscosity in comparison to the control foam 410 in response to exposure to a temperature of 200° F., indicating that a stronger gel was formed by the foam 420 in comparison to the control foam 410.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

As used in this disclosure, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

As used in this disclosure, the term "about" or "approximately" can allow for a degree of variability in a value or range, for example, within 10%, within 5%, or within 1% of a stated value or of a stated limit of a range.

As used in this disclosure, the term "substantially" refers to a majority of, or mostly, as in at least about 50%, 60%, 70%, 80%, 90%, 95%, 96%, 97%, 98%, 99%, 99.5%, 99.9%, 99.99%, or at least about 99.999% or more.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "0.1% to about 5%" or "0.1% to 5%" should be interpreted to include about 0.1% to about 5%, as well as the individual values (for example, 1%, 2%, 3%, and 4%) and the subranges (for example, 0.1% to 0.5%, 1.1% to 2.2%, 3.3% to 4.4%) within the indicated range. The statement "X to Y" has the same meaning as "about X to about Y," unless indicated otherwise. Likewise, the statement "X, Y, or Z" has the same meaning as "about X, about Y, or about Z," unless indicated otherwise.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described components and systems can generally be integrated together or packaged into multiple products.

Accordingly, the previously described example implementations do not define or constrain the present disclosure. Other changes, substitutions, and alterations are also possible without departing from the spirit and scope of the present disclosure.

What is claimed is:

1. A foam composition consisting of:
    a foam stabilizer comprising a composite material, the composite material comprising graphene in the form of a mixture of hydrophilic single and multilayer graphene nanoplatelets;
    a foaming agent comprising a viscoelastic surfactant;
    a brine; and
    an inert gas in the form of gas bubbles dispersed through a mixture of the foam stabilizer, the foaming agent, and the brine, wherein the foam composition is configured to convert to a gel that is impermeable to aqueous fluid flow in response to exposure to downhole conditions of a subterranean zone.

2. The foam composition of claim 1, wherein the foam stabilizer is in a range of from 0.7 weight per volume percent (w/v %) to 1.5 w/v % of the foam composition.

3. The foam composition of claim 2, wherein the foaming agent is in a range of from 5 volume percent (vol. %) to 15 vol. % of the foam composition.

4. The foam composition of claim 2, wherein the brine is in a range of from 85 vol. % to 95 vol. % of the foam composition.

5. The foam composition of claim 2, wherein the inert gas is nitrogen gas, and a foam quality of the foam composition is in a range of from 60% to 70%.

6. The foam composition of claim 1, wherein:
    the brine comprises potassium chloride and has a salt concentration in a range of from 0.5 weight percent (wt. %) to 40 wt. %;
    the foaming agent is 10.5 volume percent (vol. %) of the foam composition; and
    the composite material comprises 92 wt. % carbon and 7 wt. % oxygen.

7. A method comprising:
    placing a first mixture of a foam stabilizer, a foaming agent, and a brine into a wellbore formed in a subterranean formation, wherein the foam stabilizer comprises a composite material, the composite material comprising graphene in the form of a mixture of hydrophilic single and multilayer graphene nanoplatelets, and the foaming agent comprises a viscoelastic surfactant;
    placing an inert gas into the wellbore, wherein the inert gas and the first mixture are placed together into the wellbore, such that the inert gas disperses as gas bubbles throughout the first mixture to form a foam;
    flowing the foam to a specified downhole location in the subterranean formation, thereby exposing the foam to a downhole temperature, which causes the foam to convert to a gel that is impermeable to aqueous fluid flow; and
    prior to flowing the foam to the specified downhole location, flowing a cooling fluid comprising water into the wellbore, thereby reducing a downhole temperature in the subterranean formation, increasing gelation time of the foam, and allowing the foam to penetrate into the subterranean formation to reach the specified downhole location before converting to the gel.

8. The method of claim 7, wherein additional inert gas is flowed together with the foam into the wellbore.

9. The method of claim 8, wherein the foam stabilizer is in a range of from 0.7 weight per volume percent (w/v %) to 1.5 w/v % of the foam.

10. The method of claim 9, wherein the foaming agent is in a range of from 5 volume percent (vol. %) to 15 vol. % of the foam.

11. The method of claim 9, wherein the brine is in a range of from 85 vol. % to 95 vol. % of the foam.

12. The method of claim 9, wherein the inert gas is nitrogen gas, and a foam quality of the foam is in a range of from 60% to 70%.

13. The method of claim 7, wherein:
    the brine comprises potassium chloride and has a salt concentration in a range of from 0.5 weight percent (wt. %) to 40 wt. %;
    the foaming agent is 10.5 volume percent (vol. %) of the foam; and
    the composite material comprises 92 wt. % carbon and 7 wt. % oxygen.

14. A method comprising:
    mixing a foam stabilizer, a foaming agent, a brine, and nitrogen gas to form a foam, the foam stabilizer comprising a composite material, the composite material comprising graphene in the form of a mixture of hydrophilic single and multilayer graphene nanoplatelets, and the foaming agent comprising a viscoelastic surfactant;
    flowing the foam and additional nitrogen gas together into a wellbore formed in a subterranean formation to a specified downhole location in the subterranean formation, thereby exposing the foam to a downhole temperature, which causes the foam to convert to a gel that is impermeable to aqueous fluid flow;
    prior to flowing the foam to the specified downhole location, flowing a cooling fluid comprising water into the wellbore, thereby reducing a downhole temperature in the subterranean formation, increasing gelation time of the foam, and allowing the foam to penetrate into the subterranean formation to reach the specified downhole location before converting to the gel; and after the foam has converted to the gel, producing a hydrocarbon from the subterranean formation, wherein the gel prevents leakage of aqueous fluid from the specified downhole location, such that the aqueous fluid is prevented from being produced with the hydrocarbon from the subterranean formation.

15. The method of claim 14, wherein:

the brine comprises potassium chloride and has a total dissolved solids level in a range of from 0.5 weight percent (wt. %) to 40 wt. %;

the foaming agent is 10.5 volume percent (vol. %) of the foam; and the composite material comprises 92 wt. % carbon and 7 wt. % oxygen.

16. The method of claim 14, wherein:

the foam stabilizer is in a range of from 0.7 weight per volume percent (w/v %) to 1.5 w/v % of the foam; and the foaming agent is in a range of from 5 volume percent (vol. %) to 15 vol. % of the foam.

17. The method of claim 14, wherein a foam quality of the foam is in a range of from 60% to 70%.

* * * * *